United States Patent
Pivowar et al.

(10) Patent No.: US 6,466,236 B1
(45) Date of Patent: Oct. 15, 2002

(54) SYSTEM AND METHOD FOR DISPLAYING AND MANIPULATING MULTIPLE CALENDARS ON A PERSONAL DIGITAL ASSISTANT

(75) Inventors: Alvin Pivowar; Steve Hanrahan; Pete Grillo, all of Portland, OR (US)

(73) Assignee: Palm, Inc., Santa Clara, CA (US)

(*) Notice: Subject to any disclaimer, the term of this patent is extended or adjusted under 35 U.S.C. 154(b) by 0 days.

(21) Appl. No.: 09/288,774

(22) Filed: Apr. 8, 1999

(51) Int. Cl.⁷ .................................................. G06F 3/00
(52) U.S. Cl. ...................... 345/835; 345/864; 345/963
(58) Field of Search ............................ 345/326, 329, 345/333, 334, 339, 340, 348, 350, 351, 352, 354, 357, 963, 169, 173, 700, 703, 733, 744, 764, 765, 775, 776, 781, 810, 835, 840, 843, 864, 854, 866; 705/8, 9

(56) References Cited

U.S. PATENT DOCUMENTS

| | | | |
|---|---|---|---|
| 4,831,552 A | * 5/1989 | Scully et al. | 345/329 |
| 5,129,057 A | * 7/1992 | Strope et al. | 345/348 |
| 5,214,768 A | 5/1993 | Martin et al. | 711/114 |
| 5,261,045 A | 11/1993 | Scully | 345/751 |
| 5,412,791 A | 5/1995 | Martin et al. | 711/114 |
| 5,457,476 A | * 10/1995 | Jenson | 345/146 |
| 5,479,411 A | 12/1995 | Klein | 379/88.13 |
| 5,528,745 A | * 6/1996 | King et al. | 345/326 |
| 5,557,659 A | 9/1996 | Hyde-Thompson | 379/88.13 |
| 5,572,643 A | 11/1996 | Judson | 709/218 |
| 5,621,458 A | * 4/1997 | Mann et al. | 348/232 |
| 5,647,002 A | 7/1997 | Brunson | 709/206 |
| 5,684,990 A | 11/1997 | Boothby | 707/203 |
| 5,740,549 A | 4/1998 | Reilly et al. | 705/14 |
| 5,745,884 A | 4/1998 | Carnegie et al. | 705/34 |
| 5,790,974 A | 8/1998 | Tognazzini | 701/204 |
| 5,809,242 A | 9/1998 | Shaw et al. | 709/217 |

(List continued on next page.)

FOREIGN PATENT DOCUMENTS

WO    WO99/06900    11/1999

OTHER PUBLICATIONS

Puma Technology, Intellisync, http://www.pumatech.com/intellisync.html, Feb. 22, 1999.
TrueSync Technology, TrueSync Tehcnology Platform, http://www.starfich.com/products/truetech/truetech.html, Feb. 22, 1999.
When.com, What is When.com?, http://www.when.com, Apr. 7, 1999.
PointCast, PointCast Network, http://www.pointcast.com/products/pcn/index.html?homepb, Apr. 7, 1999.
PointCast, PointCast Network, http://www.pointcast.com/products/pcn/hwork.html?pcnidxbody Apr. 7, 1999.

*Primary Examiner*—Crescelle N. dela Torre

(57) ABSTRACT

A portable, hand-held personal digital assistant is provided for simultaneously depicting multiple calendars on a single display. The personal digital assistant includes a portable, hand-held housing including a top face, a bottom face, and a side wall therebetween for defining an interior space. An input device is situated on the top face of the housing for allowing input of data. Associated therewith is a display situated on the top face of the housing for depicting data. Situated in the interior space of the housing is memory for storing a plurality of calendars each including a plurality of scheduled matters. Finally, controller is situated in the interior space of the housing and connected between the input device, the display, and the memory. The controller serves for simultaneously depicting a plurality of the calendars on the display. By conveniently displaying the multiple calendars, the present invention allows a user to more effectively manipulate the same.

27 Claims, 17 Drawing Sheets

U.S. PATENT DOCUMENTS

| | | | |
|---|---|---|---|
| 5,862,346 A | 1/1999 | Kley | 709/245 |
| 5,870,759 A | 2/1999 | Bauer et al. | 707/201 |
| 5,877,759 A * | 3/1999 | Bauer | 345/339 |
| 5,907,678 A | 5/1999 | Housel, III et al. | 709/213 |
| 5,933,811 A | 8/1999 | Angles et al. | 705/14 |
| 5,949,975 A | 9/1999 | Batty et al. | 709/213 |
| 5,966,714 A | 10/1999 | Huang | 707/201 |
| 5,982,891 A | 11/1999 | Ginter et al. | 705/54 |
| 5,999,912 A | 12/1999 | Wodarz et al. | 705/14 |
| 6,000,000 A | 12/1999 | Hawkins et al. | 707/201 |
| 6,009,410 A | 12/1999 | LeMole et al. | 705/14 |
| 6,011,537 A | 1/2000 | Slotznick | 345/733 |
| 6,014,502 A | 1/2000 | Moraes | 709/219 |
| 6,023,708 A | 2/2000 | Mendez | 707/203 |
| 6,026,369 A | 2/2000 | Capek | 705/14 |
| 6,026,371 A | 2/2000 | Beck et al. | 705/14 |
| 6,034,621 A | 3/2000 | Kaufman | 340/7.21 |
| 6,034,661 A | 3/2000 | Servan-Scheiber et al. | 345/668 |
| 6,034,683 A * | 3/2000 | Mansour et al. | 345/339 |
| 6,058,415 A | 5/2000 | Polcyn | 709/200 |
| 6,101,480 A * | 8/2000 | Conmy et al. | 705/9 |
| 6,131,096 A | 10/2000 | Ng | 707/10 |
| 6,131,116 A | 10/2000 | Riggins | 709/219 |
| 6,138,245 A | 10/2000 | Son et al. | 713/400 |
| 6,151,606 A | 11/2000 | Mendez | 707/201 |
| 6,161,146 A | 12/2000 | Kley | 709/248 |

* cited by examiner

SYSTEM AND METHOD FOR DISPLAYING AND MANIPULATING MULTIPLE CALENDARS ON A PERSONAL DIGITAL ASSISTANT

CROSS REFERENCE TO RELATED APPLICATIONS

The present application is related to co-pending applications entitled "System and Method for Synchronizing Multiple Calendars over a Wide Area Network" by Inventors Alvin Pivowar, Steve Hanrahan and Pete Grillo, Ser. No. 09/289,764, filed concurrently herewith, and incorporated herein by reference; "System and Method for Sharing Data Among a Plurality of Personal Digital Assistants" by Inventors Alvin Pivowar, Steve Hanrahan and Pete Grillo, Ser. No. 09/289,771, filed concurrently herewith, and incorporated herein by reference; "System and Method for Synchronizing Data Among a Plurality of Users Via an Intermittently Accessed Network" by Inventors Alvin Pivowar, Steve Hanrahan and Pete Grillo, Ser. No. 09/289,769, filed concurrently herewith, and incorporated herein by reference; and "System and Method for Advertising during a Data Transfer Process" by Inventors Alvin Pivowar, Steve Hanrahan and Pete Grillo, Ser. No. 09/289,273, filed concurrently herewith, and incorporated herein by reference.

FIELD OF THE INVENTION

The present invention relates generally to displaying calendars on personal digital assistants and, more particularly, to a system and method for effectively controlling the presentation and manipulation of calendars on a personal digital assistant.

BACKGROUND OF THE INVENTION

Personal digital assistants, or PDA's, are commonly known hand-held computers that can be used to store, display, and/or manipulate various personal information including, but not limited to contact information, calendar information, etc. Such information can be downloaded from other computer systems, or can be inputted by way of a stylus and pressure sensitive screen of the PDA or any other type of input device such as a mechanical keyboard or a voice recognition module. Examples of PDA's are the Palm™ computer of 3Com Corporation, and Microsoft CE™ computers which are each available from a variety of vendors.

Unlike PDA's, conventional desktop computers, in the past, have allowed the storage and manipulation of multiple calendars thereon. This capability has been prompted by the fact that desktop computers are commonly utilized by multiple users. Further, desktop computers are traditionally equipped with the technical features that are necessary to enable such functionality.

For example, a desktop computer commonly runs software that is capable of allowing various users to share a total capacity of the computer. This may be done by allowing each user to log on and retrieve, add, modify, and delete information, i.e. calendars, that are unique to such user. In terms of technical features, desktops are equipped with an abundance of memory which may be allocated to the calendars of each of the different users. Also, screens of desktop computers are typically have larger than 12" in size. This even allows multiple calendars to be displayed if desired.

Networking of computers has augmented the number of calendars that may be stored on one computer. For instance, a plurality of users may be networked to a single computer, or server, which stores calendars for the users. During operation, each of the users may utilize the server in order to access and manipulate his or her calendar. One example of this can be found on the Internet, wherein various client computers may be connected to the Internet and access one of a plurality of calendars on a single server via a web site.

The Internet has also allowed multiple users to access a single shared group calendar. Such system permits each user to view and edit various scheduled matters on the single calendar. As an option, an electronic message may be sent to each of the users of the group each time the shared group calendar is edited.

In sharp contrast, PDA's currently do not allow the display, let alone the storage of multiple calendars. This is a result of both the limited intended purpose of PDA's and also various technical limitations. For instance, PDA's are traditionally employed for the storage and manipulation of personal data, hence the name personal digital assistant. As such, PDA's conventionally allows the storage of only a single personal calendar.

Even if the storage of multiple calendars on a PDA were desired, many technical obstacles prevent such implementation. This is at least partly due to the portable nature of PDA's which mandates that the various components of PDA's, including the displays, are extremely compact. This feature tends to preclude a feasible method of displaying the multiple calendars in a way that such information may be effectively read and manipulated.

Up to now, the intended purpose and various technical limitations of PDA's has restricted the use of only one calendar per PDA. This has limited PDA users to only organizing his or her own scheduled matters without regard to the scheduled matters of others. Inherent in this limited system is a potential for increased disorganization amongst various PDA owners who interact in normal everyday life.

There is thus a need a system and method for storing multiple calendars on a PDA and further allowing the display of such calendars to enable effective retrieval, addition, modification, and deletion of the calendars.

DISCLOSURE OF THE INVENTION

A portable, hand-held personal digital assistant (PDA) is provided for simultaneously depicting multiple calendars on a single display. The PDA includes a portable, hand-held housing including a top face, a bottom face, and a side wall therebetween for defining an interior space. An input device is situated on the top face of the housing for allowing input of data. Associated therewith is a display situated on the top face of the housing for depicting data. Situated in the interior space of the housing is memory for storing a plurality of calendars each including a plurality of scheduled matters. Finally, control circuitry is situated in the interior space of the housing and connected between the input device, the display, and the memory. The control circuitry serves for simultaneously depicting a plurality of the calendars on the display. The controller is further adapted for executing multiple methods to facilitate the simultaneous display of the calendars on the display of the PDA. By conveniently displaying the multiple calendars, the present invention allows a user to more effectively manipulate the same.

In order to allow the storage, display, and manipulation of the calendars, the calendars and scheduled matters may be stored in separate calendar databases. Further included is a common database including a plurality of identification data sets each corresponding to the calendar of one of the calendar databases. Such identification data sets each include attributes corresponding to the associated calendar database. Examples of such attributes may indicate that one of the calendars is selected, a primary calendar, read only, and/or a foreign calendar. In operation, the calendars of the calendar databases in accordance with the attributes that are stored in the common database.

Further, various methods may be employed to display the calendars to allow more effective manipulation. For example, in one embodiment of the present invention, at least one calendar is depicted along with a plurality of icons each corresponding to increments of time, i.e. hours, days, and weeks. Next, the present invention allows the selection of one of the icons after which the calendar is divided into increments of time corresponding to the selected icon. As an option, the selected icon is enlarged upon a plurality of calendars being displayed simultaneously.

In another embodiment, upon the selection of a designated icon, a window is depicted which identifies each of the calendars and allows the selection of the calendars by way of any graphical interface such as check boxes. Thereafter, the selected calendars are displayed. While the selected calendars are being displayed, any of the selected calendars may be replaced with another calendar using a pull-down window.

In yet another embodiment, each calendar that is displayed is divided into sections corresponding to increments of time. Further, the scheduled matters are depicted in the sections. In use, a size of the sections is altered as a function of a number of the calendars simultaneously depicted so as to allow a sufficient amount of space for depicting the scheduled matters.

In accordance with still yet another embodiment, a user is allowed to move the scheduled matters of one of the calendars to another one of the calendars. This may be accomplished by dragging the scheduled matter on the display between the calendars.

These and other advantages of the present invention will become apparent upon reading the following detailed description and studying the various figures of the drawings.

BRIEF DESCRIPTION OF THE DRAWINGS

The foregoing and other objects, aspects, and advantages are better understood from the following detailed description of a preferred embodiment of the invention with reference to the drawings, in which.

DESCRIPTION OF THE PREFERRED EMBODIMENTS

Figure 1:
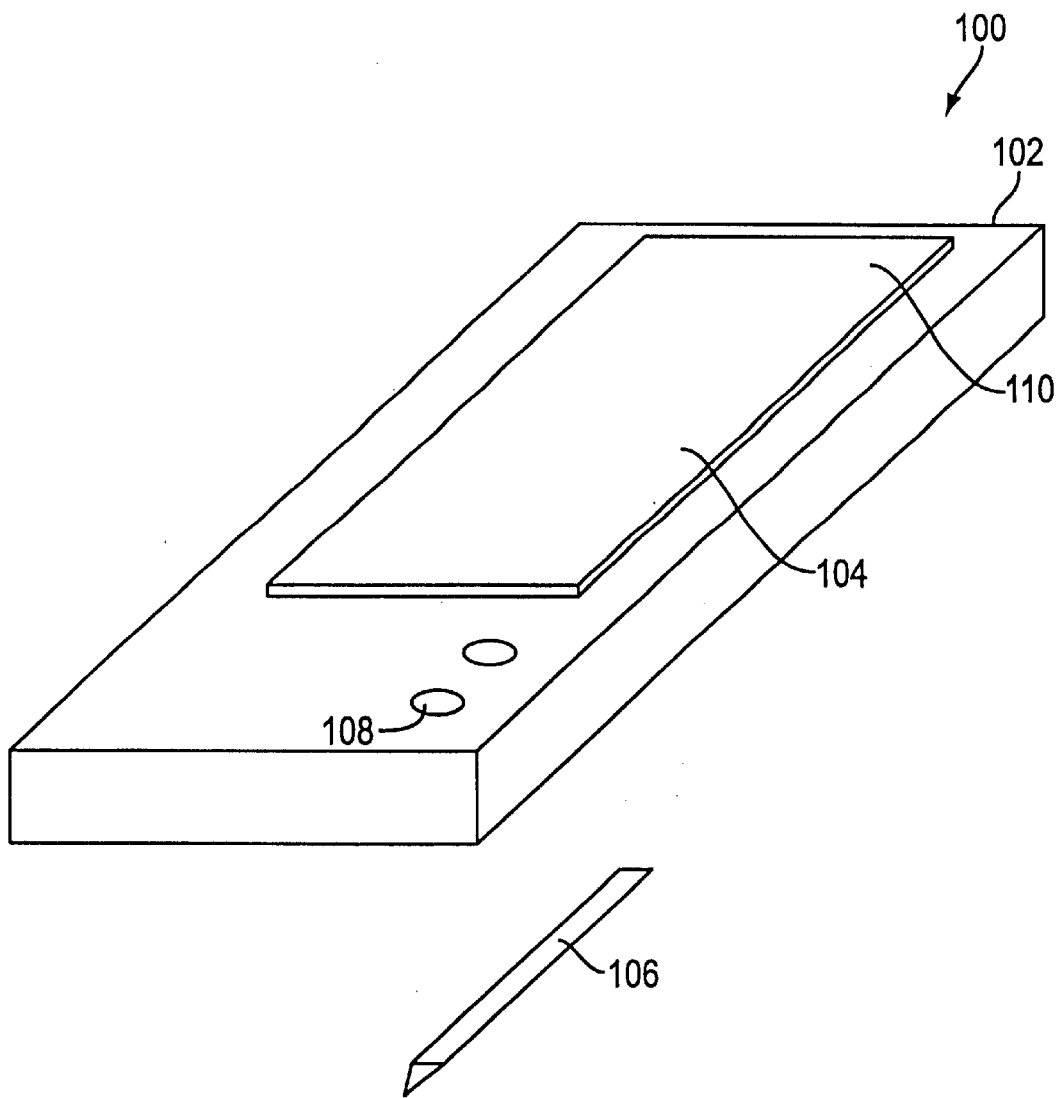
FIG. 1 is a perspective view of the personal digital assistant of one embodiment of the present invention.

With reference to FIG. 1, a preferred embodiment of the present invention includes a personal digital assistant (PDA) 100. As shown, the PDA 100 includes portable, hand-held housing 102 having a top face, a bottom face, and a side wall therebetween for defining an interior space. Situated on the top face of the housing 102 is an input device 104 which is adapted for allowing input of data. Associated therewith are a plurality of pushbuttons 108 also for input purposes. A display 110 is situated on the top face of the housing 102 for depicting data. It should be noted that the pushbuttons 108, input device 104, and/or the display 110 may be amalgamated into a single device.

Figure 2:
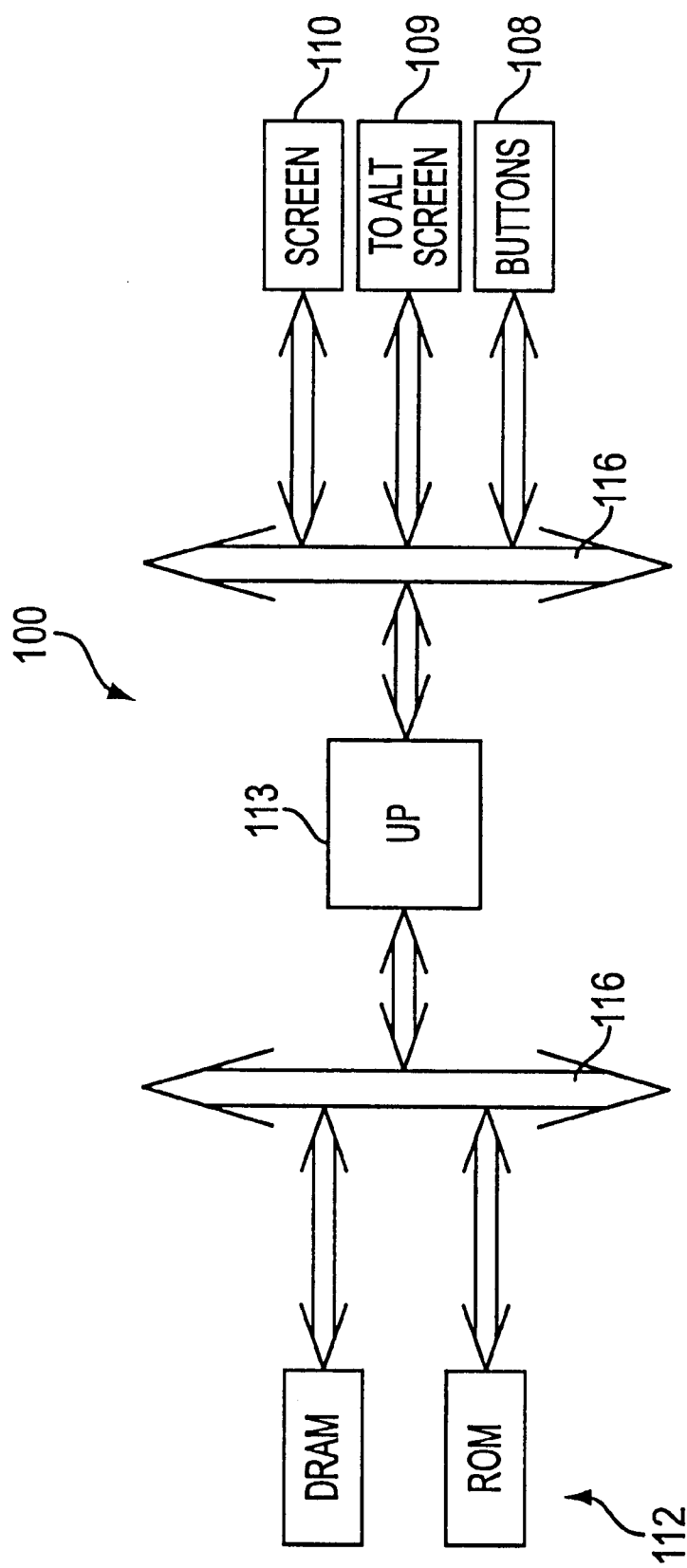
FIG. 2 is a schematic diagram showing the interconnection of the various electrical components of the personal digital assistant of FIG. 1.

As shown in FIG. 2, memory 112 is typically situated in the interior space of the housing 102. In use, the memory 112 serves for storing a plurality of calendars each including multiple scheduled matters. As shown, the memory 112 may take the form of a DRAM or ROM. Also included is a controller 113 situated in the interior space of the housing 102 and connected between the input device 104, the display 110, and the memory 112 via at least one bus 116. It should be noted that the controller 113 may include a microprocessor and accompanying software stored in the memory 112. Alternatively, the controller 113 may take the form of any hardware and/or software combination that is capable of controlling the various components of the present invention in order to carry out the intended functions.

In one embodiment, the PDA 100 may include a hand-held Palm™ PDA available from 3Com Corporation or a Microsoft CE™ computer. In the alternative, the PDA may take the form of any other type of portable data storage module which is capable storing, editing, and/or synchronizing sets of personal data. This may be accomplished by any type of I/O mechanisms including, but not limited to a display 110, a plurality of push buttons, a keyboard, a data port, an electronic writing pad using a stylus 106, a voice recognition unit, and/or any other type of I/O device capable of inputting and/or outputting personal data. It should be noted that any of the foregoing I/O devices may be mechanical in nature or, in the alternative, be incorporated into a "touch-sensitive" display.

Figure 3A:
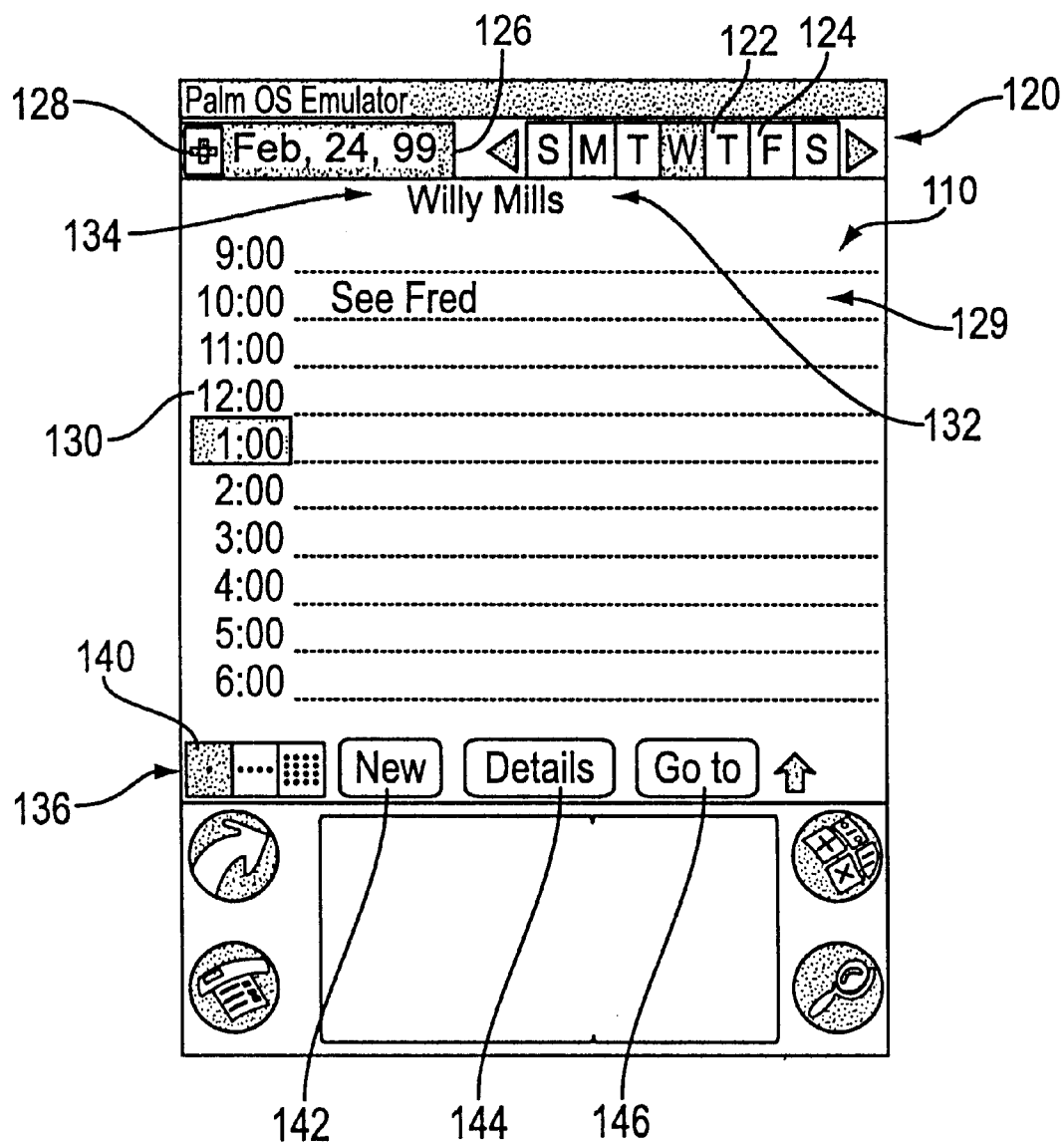
FIG. 3A is an illustration of a user interface display of the present invention showing the various features associated therewith.

During use of the PDA 100 of the present invention, various features are displayed during operation in a "calendar" mode. For example, as shown in FIG. 3A the display 110 generally includes a header 120 including a day selector bar 122 having a plurality of day select icons 124, a current date field 126, and a calendar select icon 128. Below the header 120 is a plurality of data fields 129 each corresponding to specific times which are identified by time identifiers 130. The data fields 129 also have a calendar heading 132 and an associated pull-down icon 134 positioned thereabove for reasons that will become apparent hereinafter.

With continuing reference to FIG. 3A, positioned along a lower portion of the display 110 is a time increment selector bar 136 including three time increment icons 140 each corresponding to a unique time increment. Ideally, the icons of the time increment selector bar 136 include three squares each having a number of indicia elements that corresponds to an associated time increment. It should be noted that when selected, the day select icons 124, time increment icons 140, and time identifiers 130 may be highlighted or otherwise distinguished with respect to the remaining icons and identifiers. Also shown in FIG. 3A is a new button 142, a details button 144, and a goto button 146.

It should be noted that while the calendars are being displayed, a user may utilize any one or more of the I/O devices to create, edit, modify various aspects of the calendar information such as data, security rights, or sharing rights. In various alternate embodiments, the foregoing principles may also be applied to other information such as contact information.

Figure 3B:
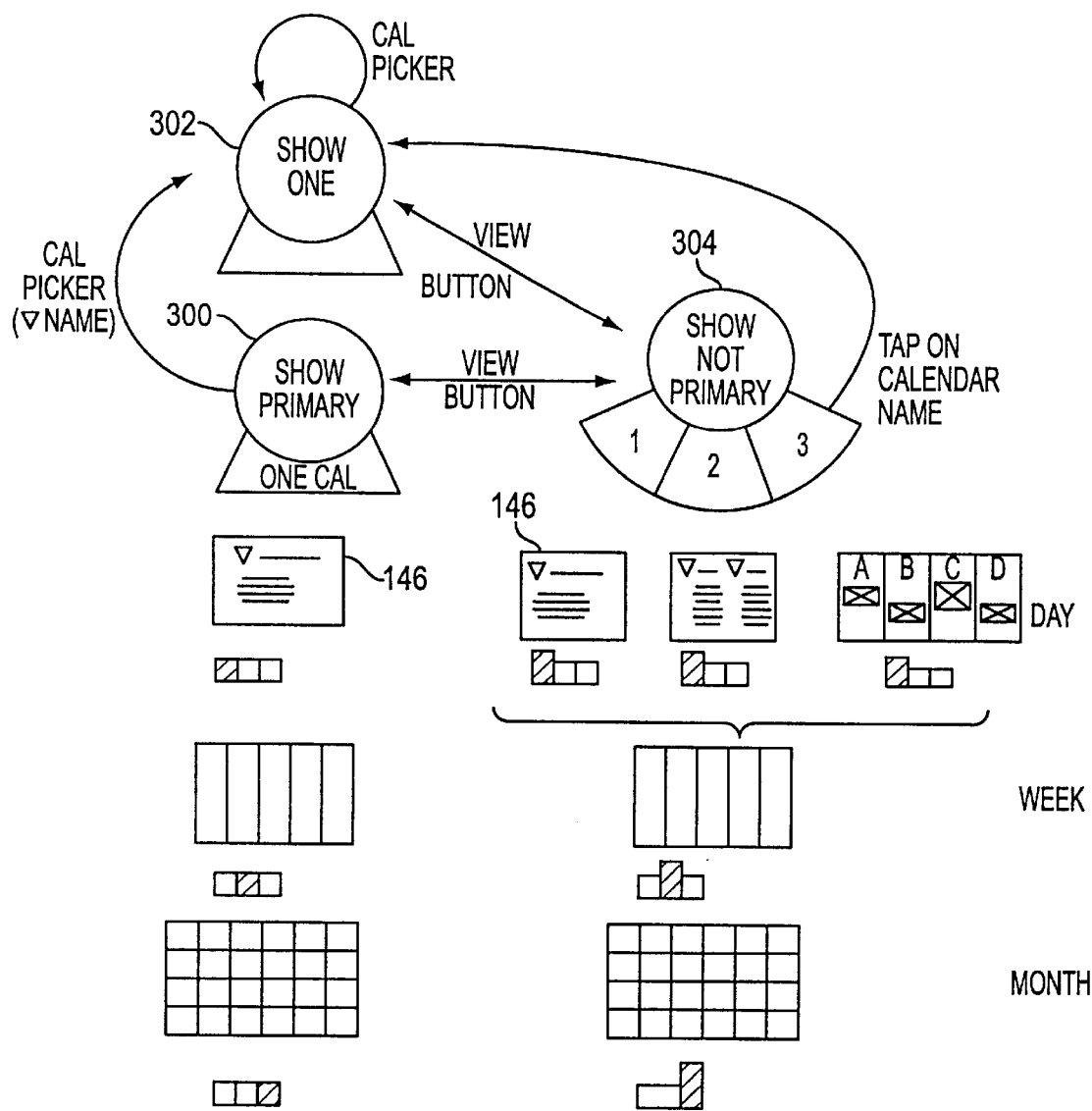
FIG. 3B is a diagram illustrating a method of displaying multiple calendars on a display the personal digital assistant of FIG. 1 in accordance with one embodiment of the present invention.

FIG. 3B generally shows the operation of one embodiment of the present invention. In use, the controller of the PDA 100 is adapted for allowing a user to simultaneously depict a plurality of the calendars 146 on the display 110. This is accomplished by permitting operation in a plurality of states. For example, in a first state 300, a single primary, or default, calendar is displayed. A second state 302 is used to depict a single calendar other than the primary calendar. In still yet another state, a third state 304, a plurality of calendars may be depicted.

During use, a user may maneuver between the various states by selecting certain items on the PDA 100. For example, while in the first state 300, a user may shift to the second state by selecting the pull-down icon 134 which in turn provides a pull-down window for allowing the selection of any available calendars in place of the primary calendar in the second state 302. In the alternative, the calendar select icon 128 may be selected which provides a separate full-size window for allowing the selection of multiple calendars to be displayed simultaneously in the third state 304. Further details regarding the operation of the pull-down window and full-size window will be set forth later.

While in the second state 302, the pull-down icon 134 may be used in a manner similar to that in the first state 300 in order to select one of the available calendars in place of the currently displayed calendar. Further, the calendar select icon 128 may be selected to provide the full-size window for allowing the selection of multiple calendars to be displayed simultaneously in the third state 304.

In the third state 304, the pull-down icon 134 of any of the calendar headings 132 can be used in a manner similar to that in the previous states in order to select one of the available calendars in place of the currently displayed calendars. Further, the calendar headings 132 may be selected for reverting to the second state 302, herein a single calendar is displayed.

As shown in FIG. 3B, in each of the states, the calendars may be divided into various selected increments of hours, days, and weeks. It should be noted that the calendars may include any type of calendars including a sports calendar, a personal calendar, a work-related calendar, and/or another person's calendar. Such calendars may be manually inputted, downloaded, or synchronized in any fashion.

Figure 3C:
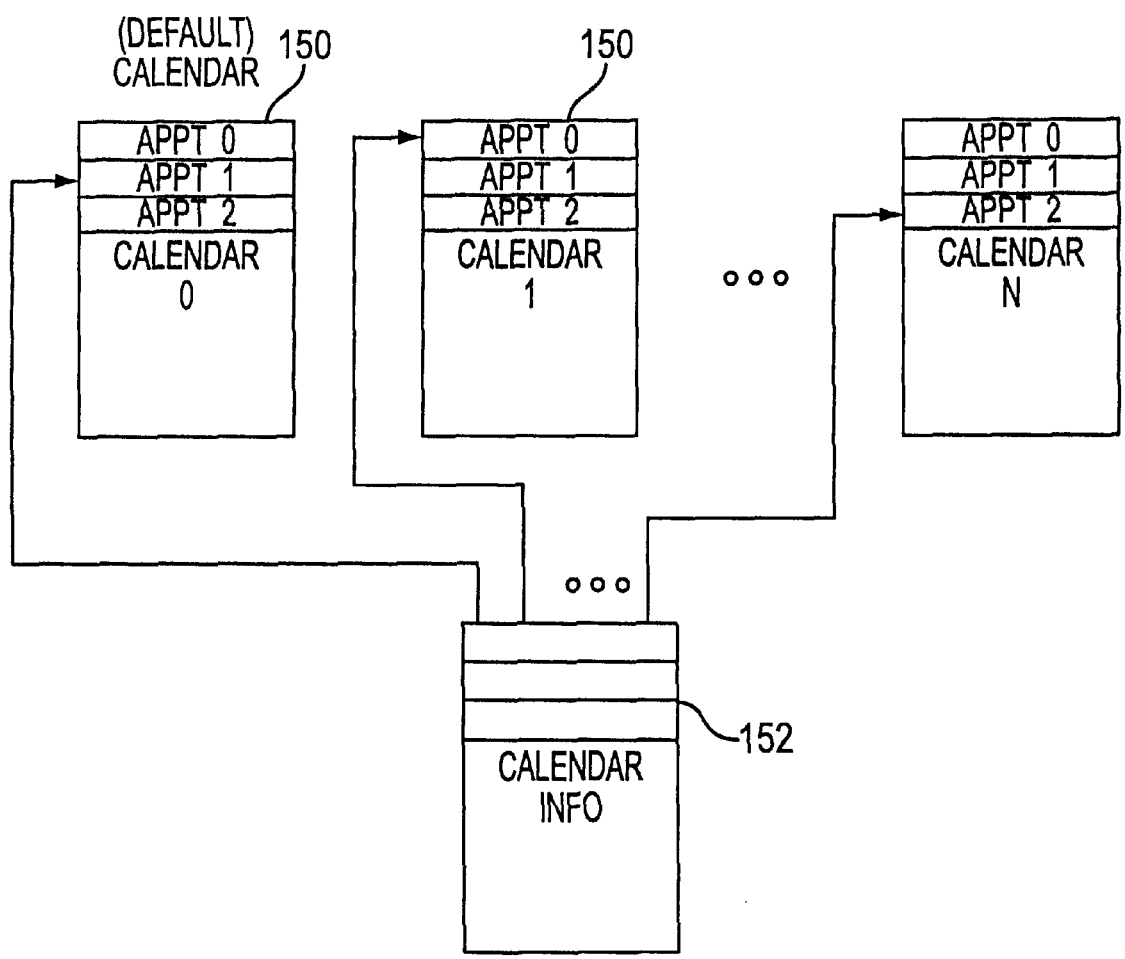
FIG. 3C is a block diagram illustrating a data structure in accordance with one embodiment of the present invention.

FIG. 3C is a block diagram illustrating a data structure which facilitates the display of multiple calendars on a display 110 of the PDA 100 of FIG. 1. In order to facilitate handling the various calendars stored within the PDA 100, each of the calendars and associated scheduled matters may be stored in separate databases 150. Further, a common database 152 may be provided including a plurality of identification data sets each corresponding to the calendar of one of the calendar databases.

In one embodiment, each identification data set includes a system name, i.e. CAL0, CAL1, CAL2, etc.; a username, i.e. Willie Mills, Dave Davies, etc.; and a plurality of attributes. As shown in FIG. 3C, such attributes may indicates that one of the calendars is selected, a primary calendar (default), read only, or a foreign calendar. It should be noted that the attributes may be selectively determined by the user or automatically assigned depending on a source of the associated calendar. In use, the common database may be referenced to display the calendars of the calendar databases in accordance with the attributes. Further, the common database allows the scheduled matters to be shared among the calendar databases.

It should be noted that the data structure of FIG. 3C is further critical for allowing the features of the present invention to be utilized with PDA's that are capable of handling only a single calendar. This backwards compatibility is enabled by allowing the data of each of the calendars including the original calendar to be stored independently. The correlation data in the form of attributes, on the other hand, is stored in a separate common database.

Figure 4:
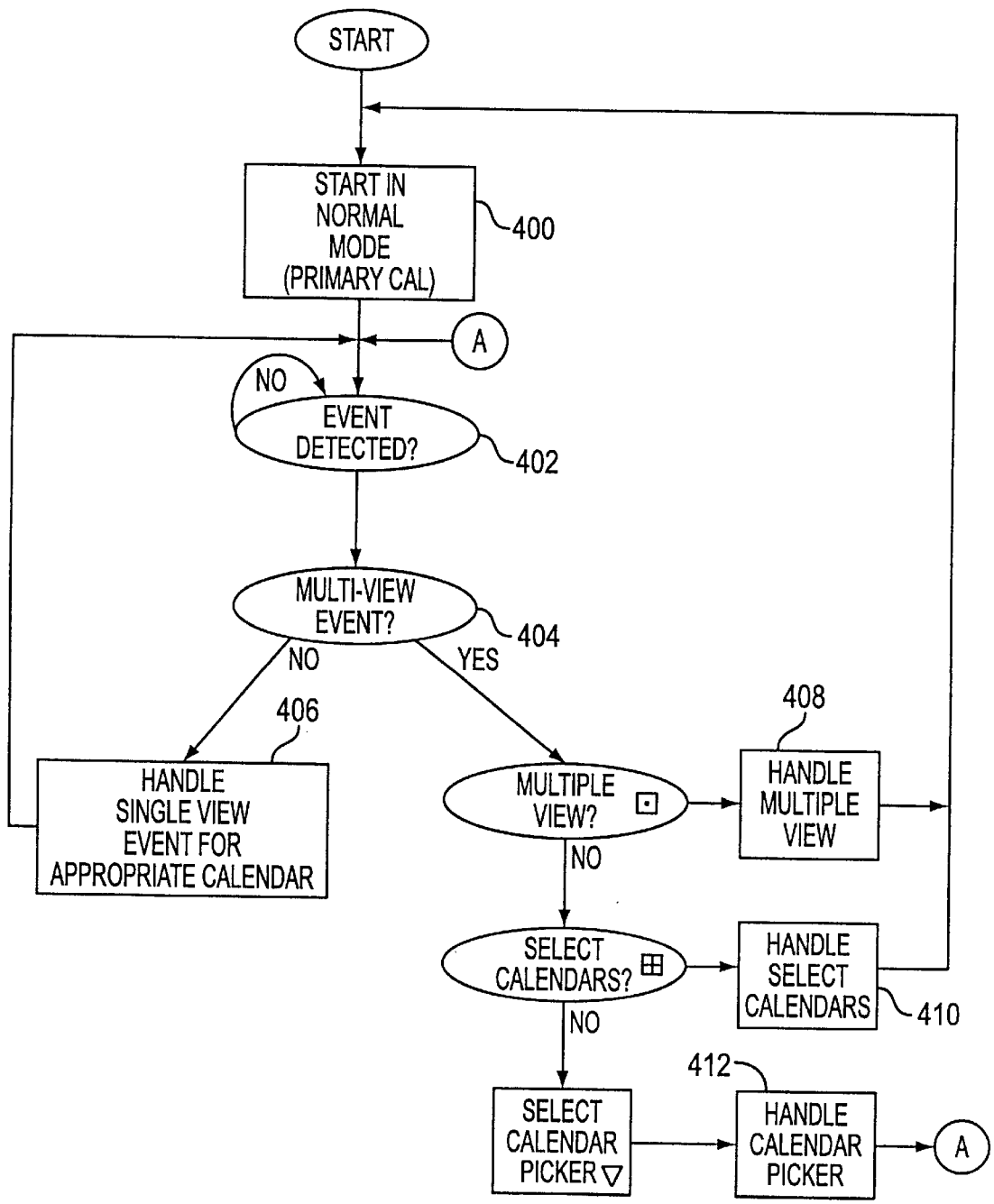
FIG. 4 is a flowchart illustrating a method of simultaneously displaying multiple calendars on a display of the personal digital assistant of FIG. 1.
Figure 9A:
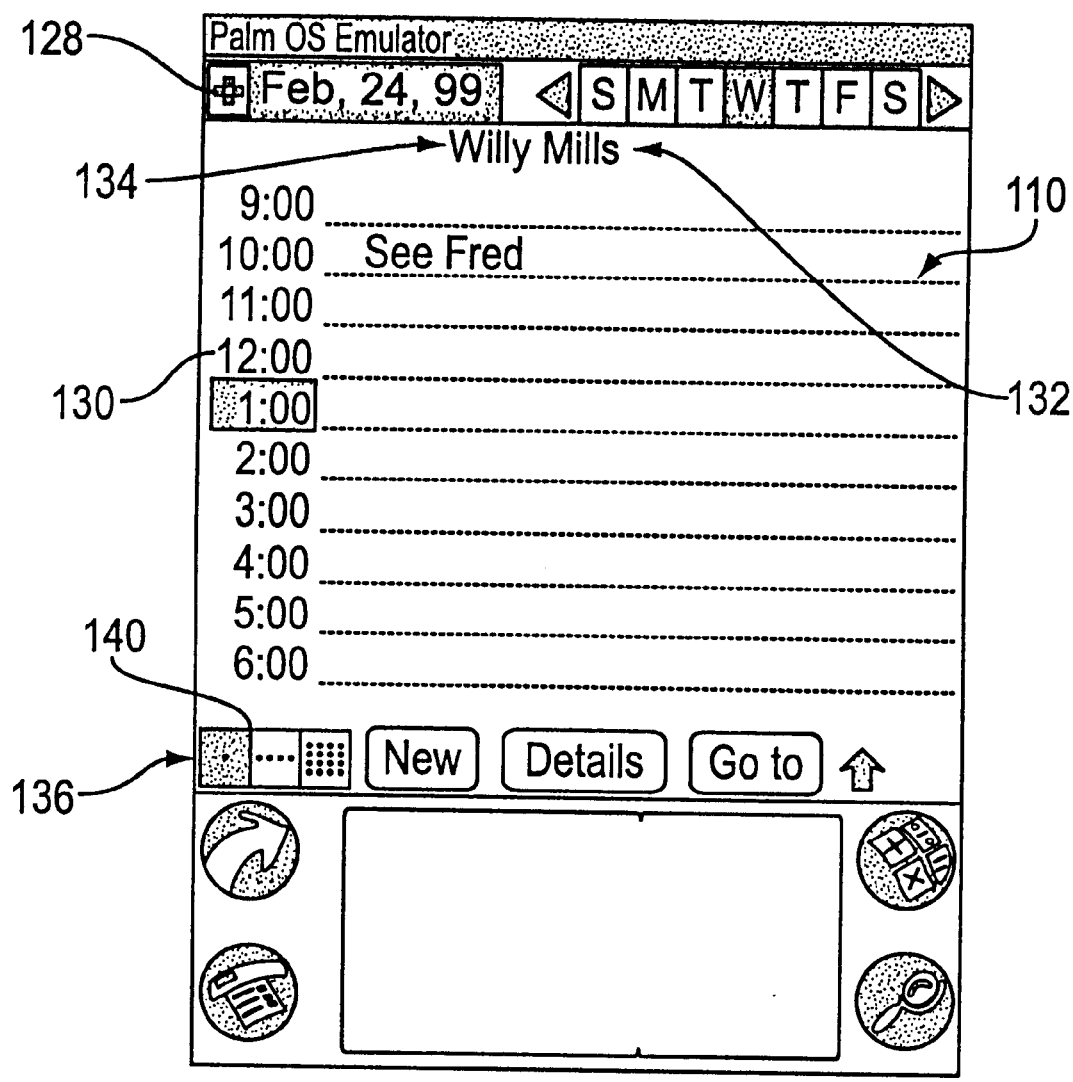
FIG. 9A is an illustration of a user interface display of the present invention showing a single calendar in increments of hours.

FIG. 4 shows a more detailed flowchart of the method of simultaneously depicting a plurality of the calendars on the display. In operation 400 of FIG. 4, the primary calendar, as indicated by the attributes, is displayed, as shown in FIG. 9A. Next, in decisions 402 and 404, a wait loop is executed until a multiple-view event, i.e. an event that requires the display of multiple calendars, is detected. If such event is not detected, the display continues normally in operation 406 of FIG. 4. Note FIG. 9A.

If, however, a multiple-view event is detected, it is then determined which type of multiple-view event has taken place. It should be noted that a multiple-view event may include the selection of the calendar select icon 128, one of the time increment icons 140, or the pull-down icon 134. If it is determined that one of the time increment icons 140 was selected in decision 404, the multiple views are handled in operation 408. If, on the other hand, it is determined that the calendar select icon 128 was selected in decision 404, the selected calendars are handled in operation 410. Finally, if it is determined that the pull-down icon 134 was selected in decision 404, the calendars are picked in operation 412. Additional details regarding operations 48, 410, and 412 will be set forth hereinafter with reference to FIGS. 5, 7, and 8.

Figure 5:
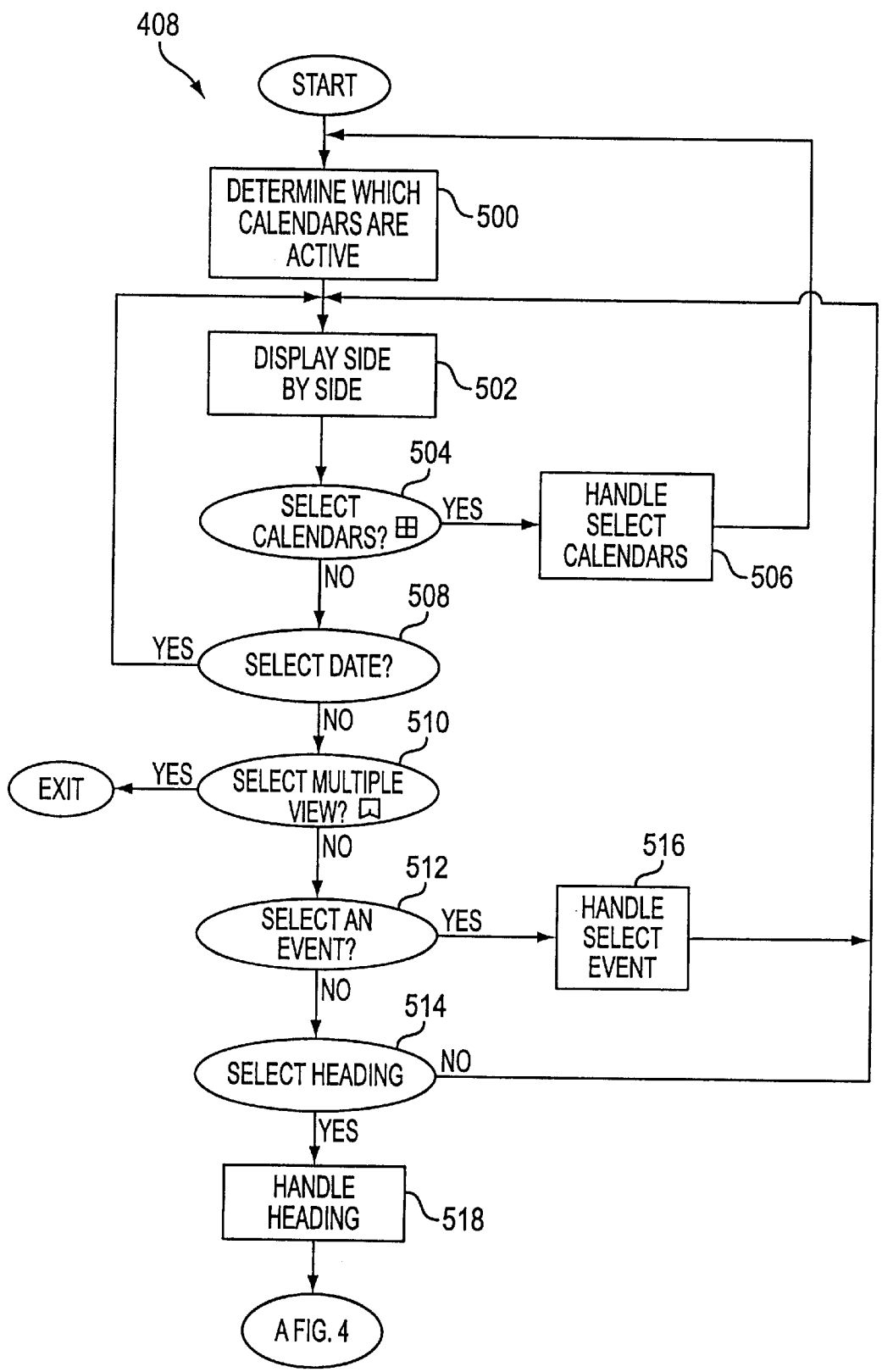
FIG. 5 is a flowchart illustrating operation 408 of FIG. 4 in greater detail.

FIG. 5 is a more detailed flowchart delineating the method associated with the operation 408 shown in FIG. 4 when one of the time increment icons 140 is selected. As shown in FIG. 5, it is first determined which calendars are active, or selected, in operation 500 after which such active calendars are displayed side-by-side in operation 502 and divided into the time increments associated with the time increment icon that was selected. In other words, the calendar(s) is divided into increments of time corresponding to one of the time increment icons 140 that is currently selected. As an option, the selected icon may be altered, i.e. enlarged, upon a plurality of calendars being displayed simultaneously, wherein the selected time increment icon is augmented as a function of a number of the calendars being displayed simultaneously. Note, for example, FIGS. 9B and 9E.

With continuing reference to FIG. 5, after the selected calendars are displayed, it is then determined in decision 504 whether the calendar select icon 128 has been selected. If so, the selected calendars are handled in operation 506. If not, it is then determined in decision 508 whether a specific time, i.e. date, has been selected. If so, then a portion of the process is repeated. If a specific time is not determined in decision 508, it is determined in decision 510 whether one of the time increment icons 140 has been selected. If so, the present method ceases. If not, however, it is then determined whether a calendar heading 132 or an event, i.e. scheduled matter, has been selected in decisions 512 and 514, respectively. Thereafter, the calendar heading 132 or event is handled in operations 516 and 518, respectively.

Figure 6:
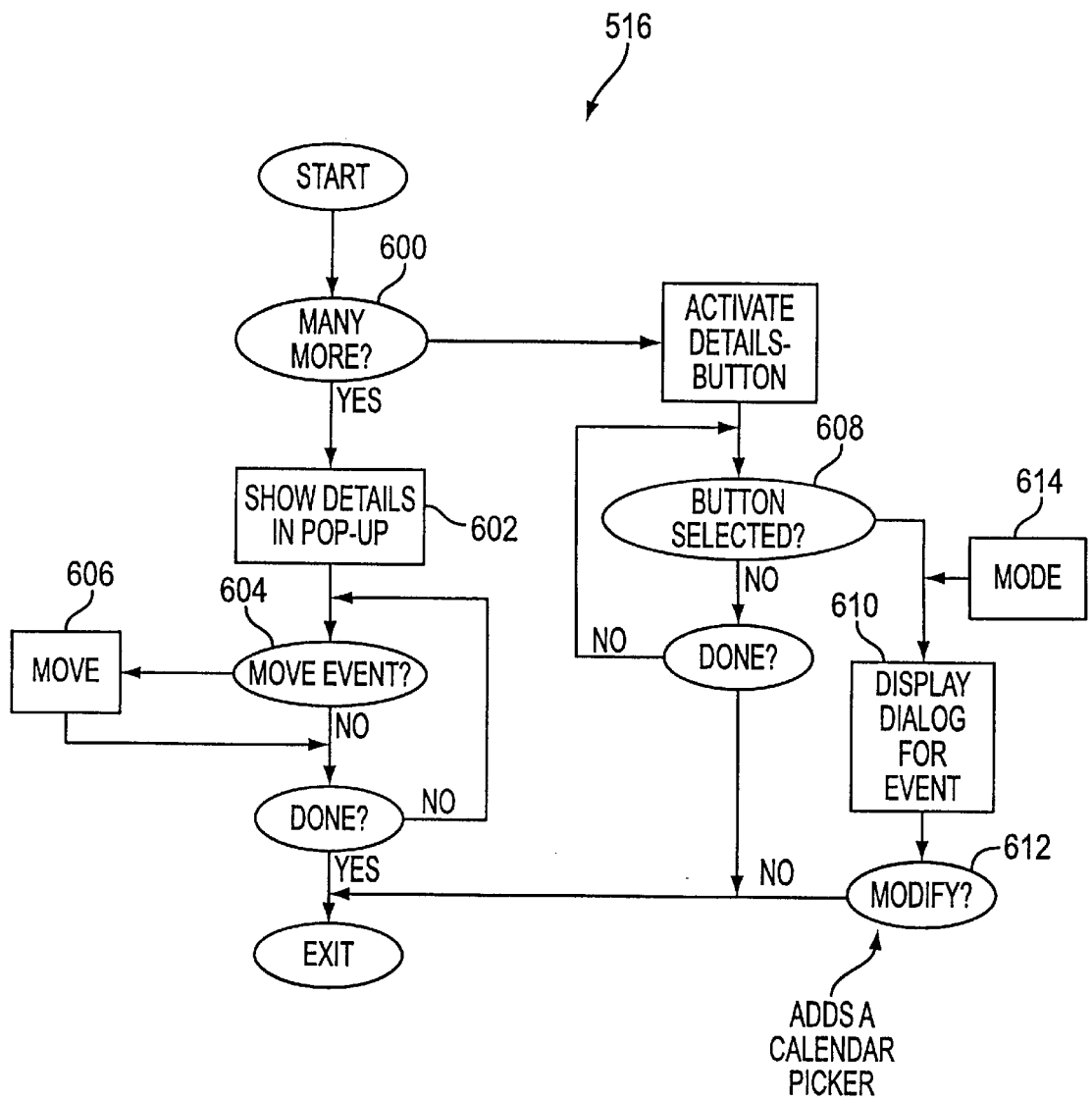
FIG. 6 is a flowchart illustrating operation 516 of FIG. 5 in greater detail.

FIG. 6 is a more detailed flowchart illustrating the method associated with operation 516 shown in FIG. 5. In particular, as shown in decision 600 of FIG. 6, it is first determined whether there is more than one calendar displayed on the PDA 100 or, in other words, whether the present invention is operating in the third state 304 of FIG. 3B. If the present invention is operating in the third state 304, details relating to the instant event, or scheduled matter, are presented in an unillustrated pop-up window in operation 602. At that point, the user may decide whether to move the instant event in decision 604. If so, in operation 606, the event may be moved to another one of the simultaneously displayed calendars by dragging the scheduled matter on the display between the calendars using the stylus 106 or any other input device.

With continuing reference to FIG. 6, it is shown that the events, or scheduled matters, of the calendars may be modified. This is accomplished by first determining whether the detail button 144 has been selected in decision 608. If it has, the event is displayed in operation 610 for modification if desired in operation 612.

Figure 7:
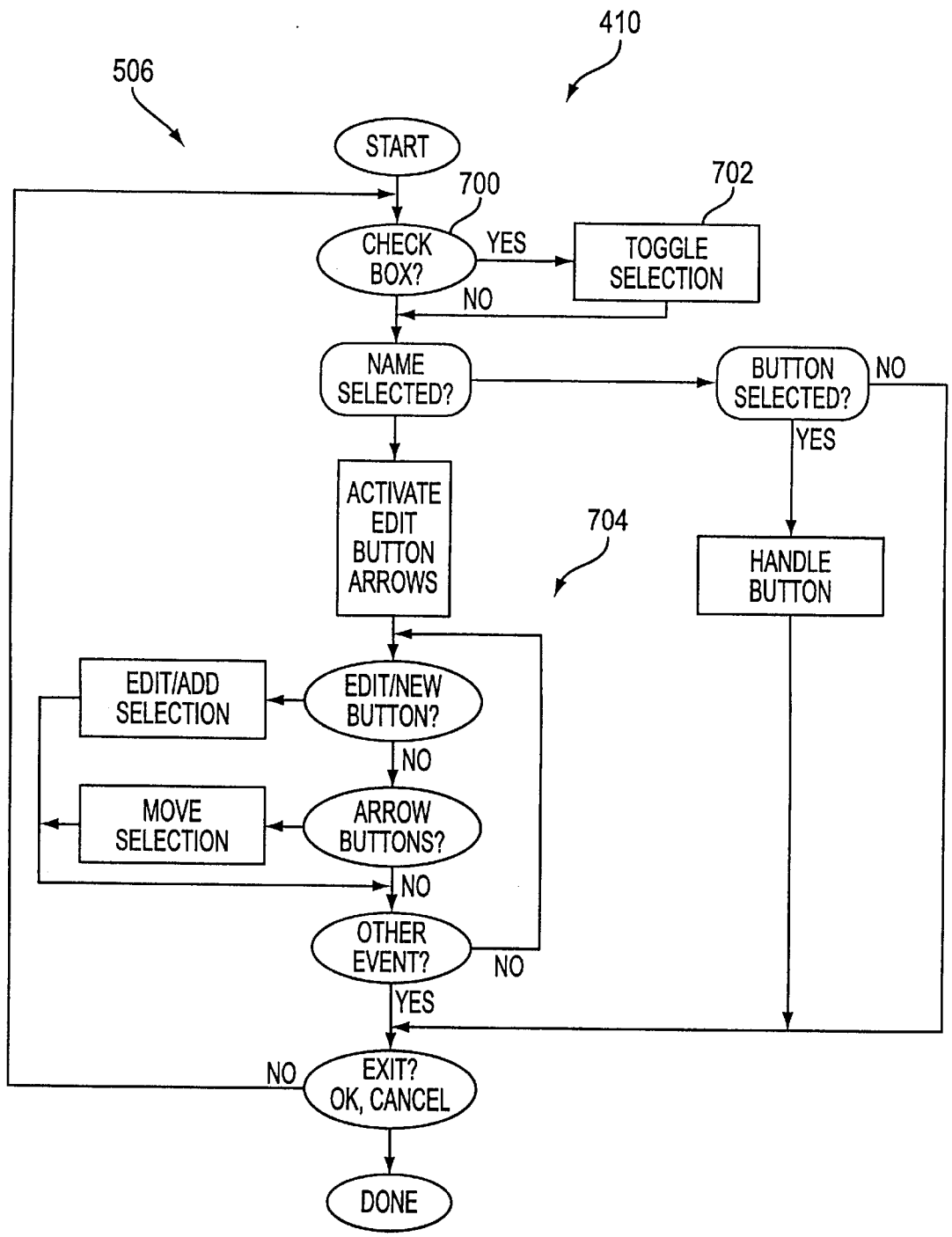
FIG. 7 is a flowchart illustrating operations 410 and 506 of FIGS. 4 and 5, respectively, in greater detail.

FIG. 7 is a more detailed flowchart delineating the method associated with operations 410 and 506 shown in FIGS. 4 and 5, respectively, when the calendar select icon 128 is selected. Upon such selection, a window 701 is displayed which identifies each of the calendars. Note FIGS. 9C and 9D. As indicated in decision 700 and operation 702, a user may select among the calendars by toggling through the identifiers and using the check boxes 703 of the window. Thereafter, the calendars may be edited, added, or moved in operations 704 using a new button 706, edit button 708, and a pair of arrow buttons 710.

Figure 8:
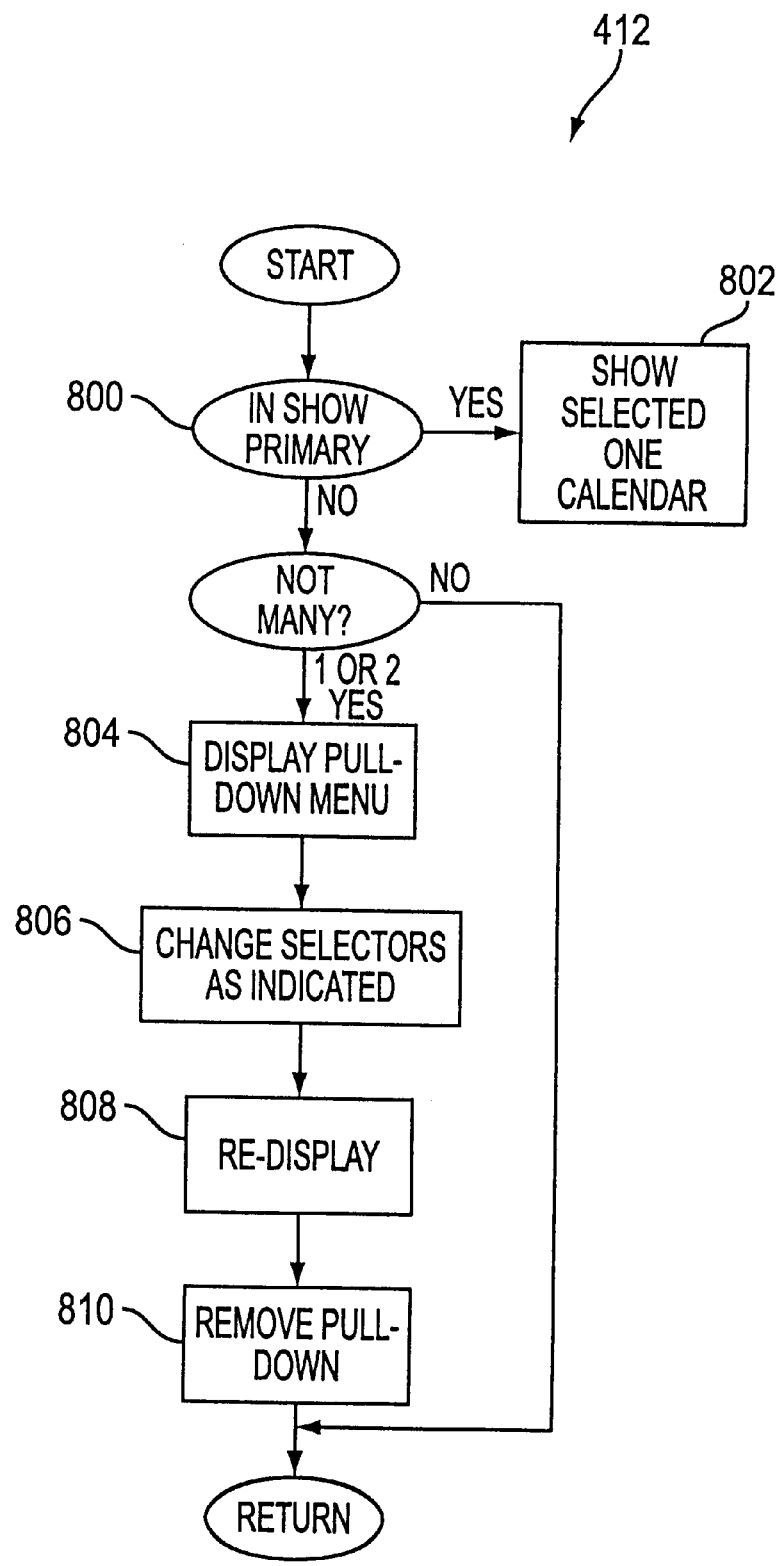
FIG. 8 is a flowchart illustrating operation 412 FIG. 4 in greater detail.

Finally, FIG. 8 is a more detailed flowchart delineating the method associated with operation 412 shown in FIG. 4 when the pull-down icon 134 was selected. As shown, it is first determined whether the calendar associated with the pull-down icon 134 is a primary calendar in decision 800. If so, then any selected calendar is shown in addition to the primary calendar in operation 802. If, however, the calendar associated with the pull-down icon 134 is not a primary calendar and there are not many calendars that are selected(1 or 2), then a pull-down window 803 is displayed in operation 804. Note FIG. 9G. Thereafter, a new calendar may be selected in operation 806 after which such selected calendar replaces the previous calendar in operation 808 in the corresponding section of the display. Finally, the pull-down window is disabled in operation 810.

With specific reference now to FIGS. 9A–9G, various graphical user interfaces are shown that may occur during use of the present invention. FIG. 9A depicts a single calendar divided into increments of hours. As shown, the time increment icons 140 of the time increment selector bar 136 are of a similar size when a single calendar is displayed.

Figure 9B:
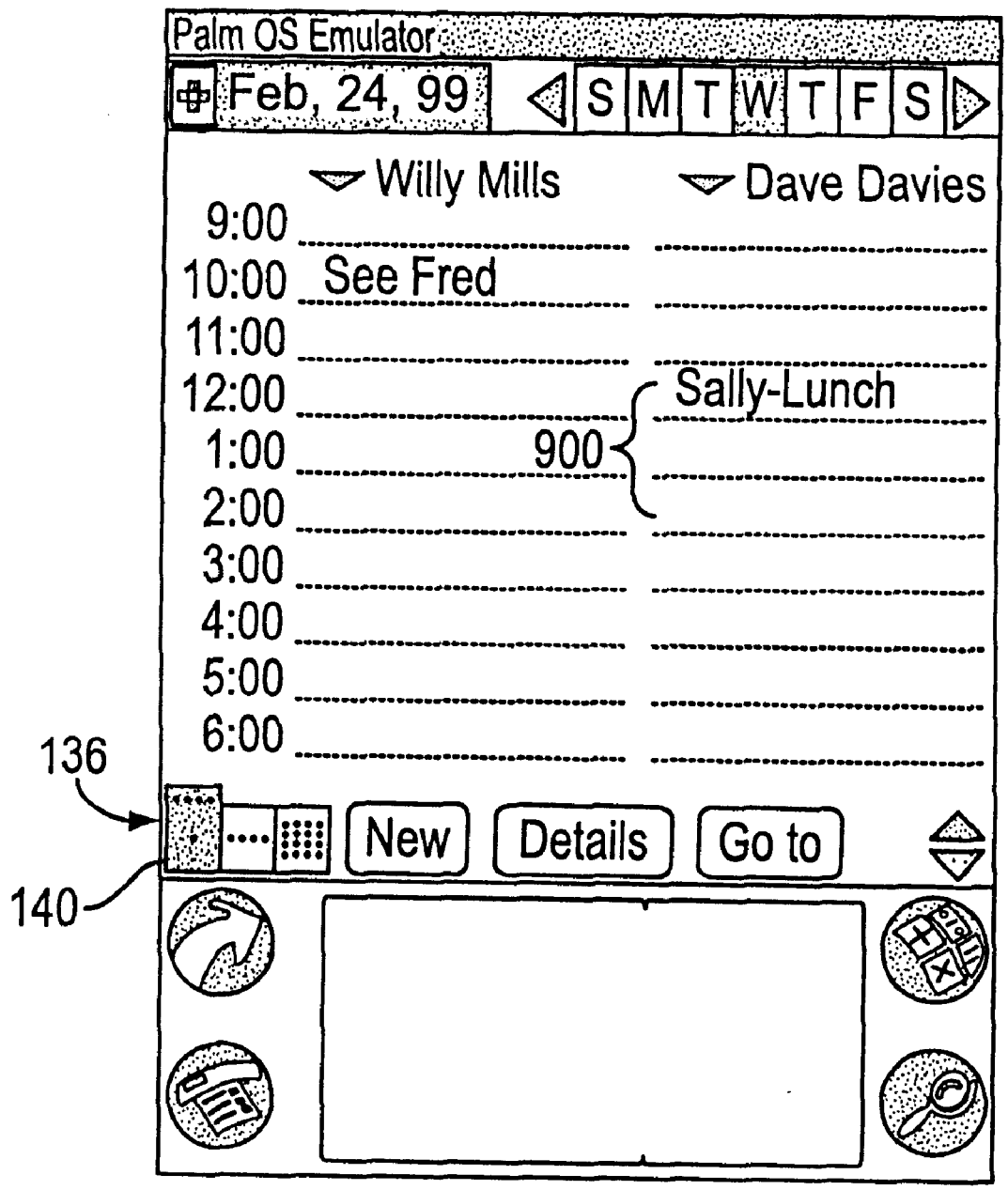
FIG. 9B is an illustration of a user interface display of the present invention showing a pair of calendars in increments of hours along with a marked duration of a scheduled matter.

FIG. 9B shows a pair of calendars displayed simultaneously in a side-by-side relationship and each divided into increments of hours. It should be noted that the time increment icon 140 that corresponds to the increments of hours is enlarged since multiple calendars are displayed. Further, a time duration bar 900 is included for indicating a time period during which a scheduled matter is arranged.

Figure 9C:
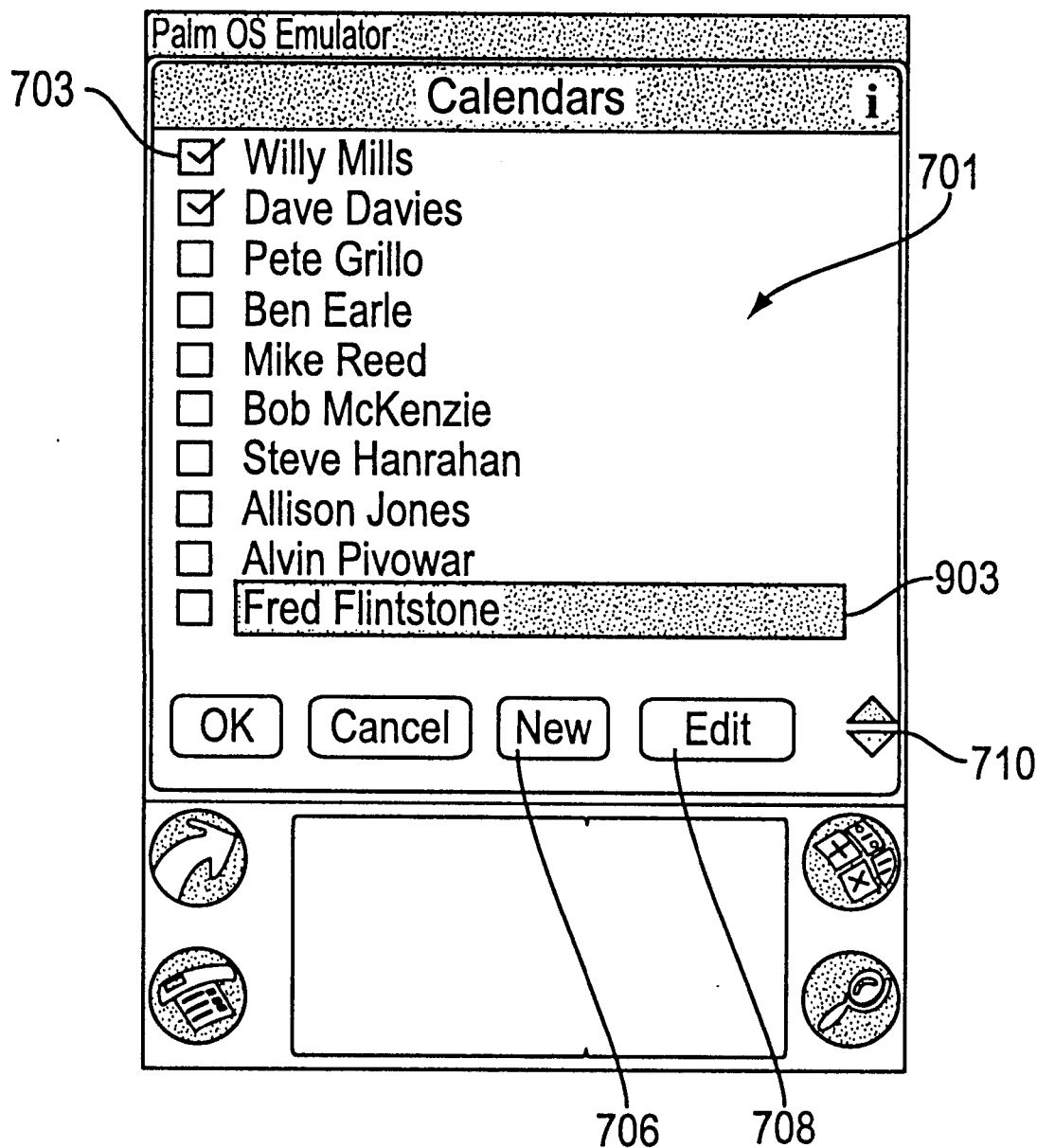
FIG. 9C is an illustration of a user interface display of the present invention showing window for selecting which calendars are to be displayed simultaneously.
Figure 9D:
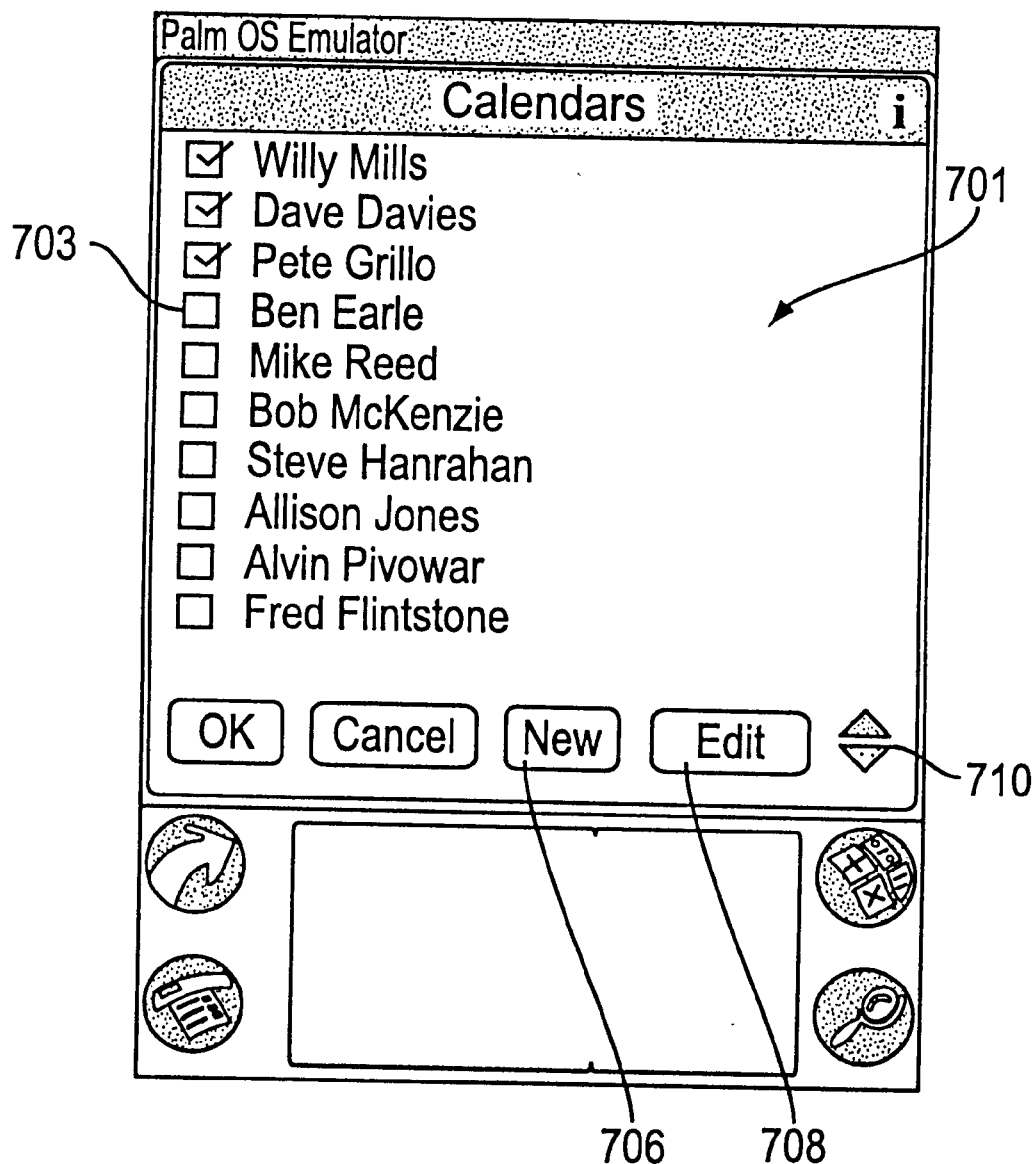
FIG. 9D is an illustration of a user interface display of the present invention showing window for selecting which calendars are to be displayed simultaneously, wherein an additional calendar is selected by way of a check box.

FIG. 9C depicts the full-size window 701 which displays all of the calendars available to be picked. As shown, checkboxes 703 are available to facilitate such selection. As mentioned earlier, in order for the full-size window 701 to be displayed, the calendar select icon 128 of FIG. 3A must be selected. FIG. 9D also shows the full-size window 701, but with an additional selected calendar. As shown, selection of a calendar is facilitated by way of a highlight bar 903.

Figure 9E:
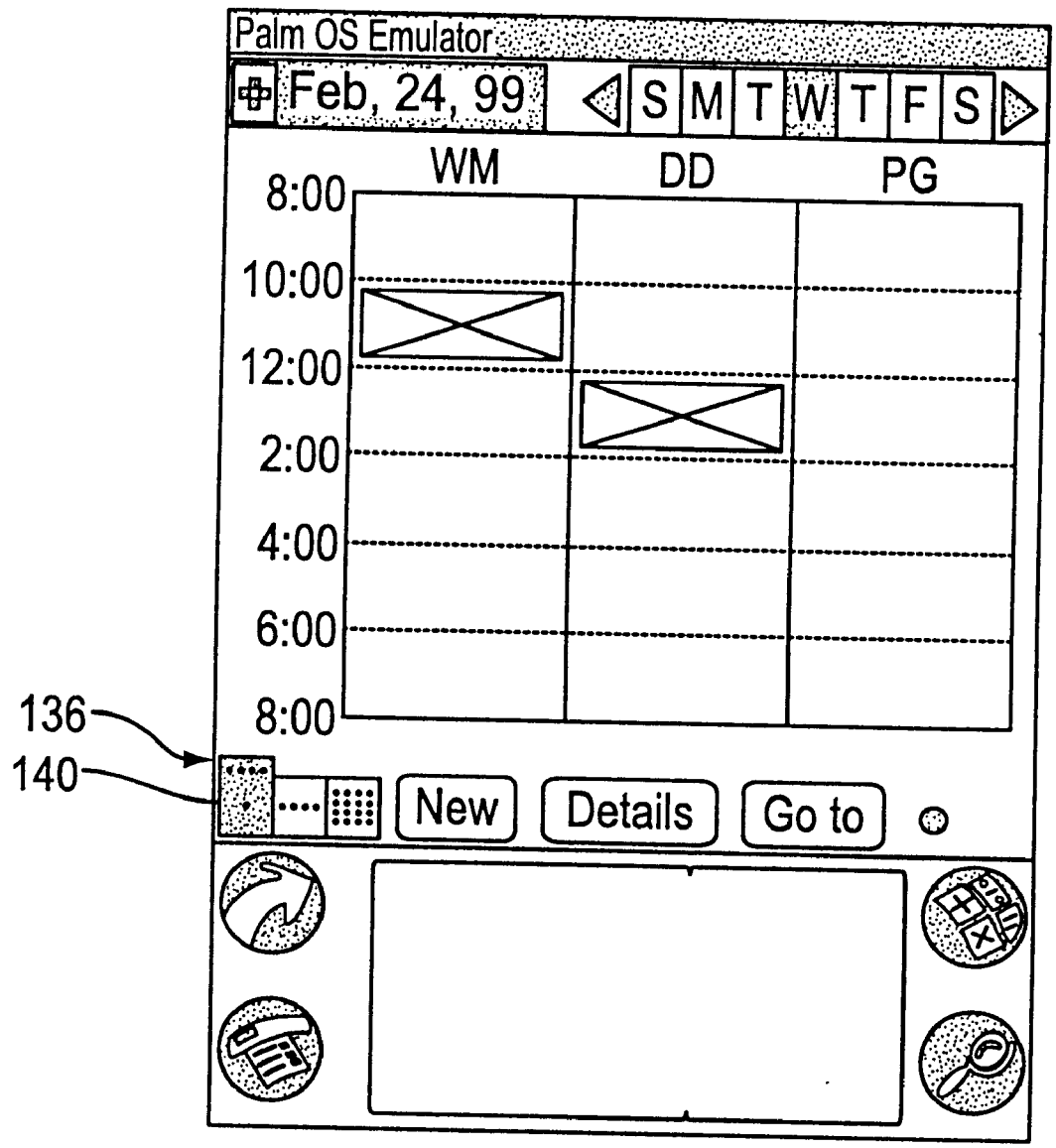
FIG. 9E is an illustration of a user interface display of the present invention showing three calendars in increments of hours, wherein the sections corresponding to each increment of time is augmented since a large number of calendars are displayed at once.

FIG. 9E depicts three calendars displayed simultaneously in a side-by-side relationship and each divided into increments of hours. As shown, the sections of each calendar are enlarged to compensate for the smaller areas in which the calendars are fitted. In the present display, the time increment icon 140 that corresponds to the increments of hours is enlarged.

Figure 9F:
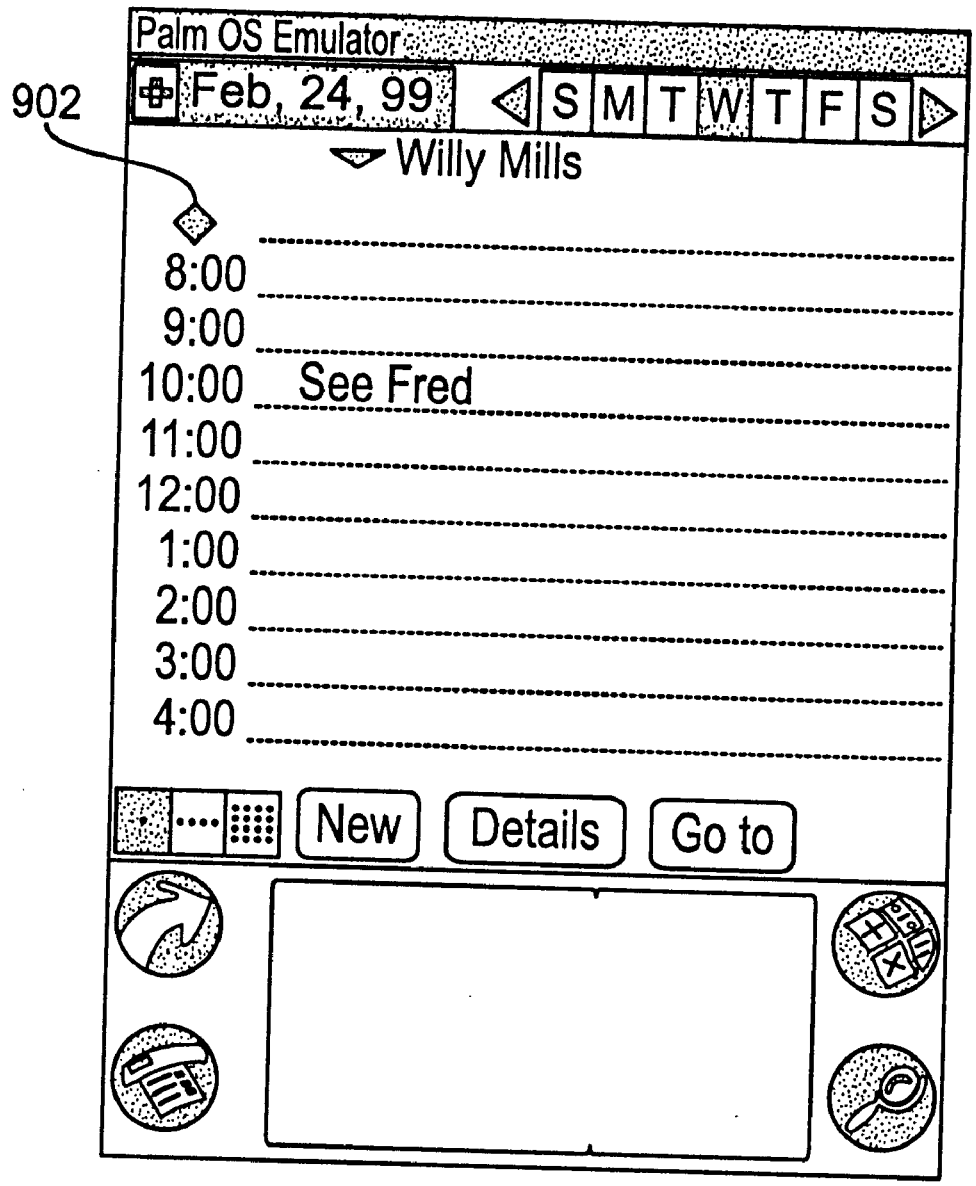
FIG. 9F is an illustration of a user interface display of the present invention showing one calendar in increments of hours with a marked duration of a scheduled matter along with descriptive text.
Figure 9G:
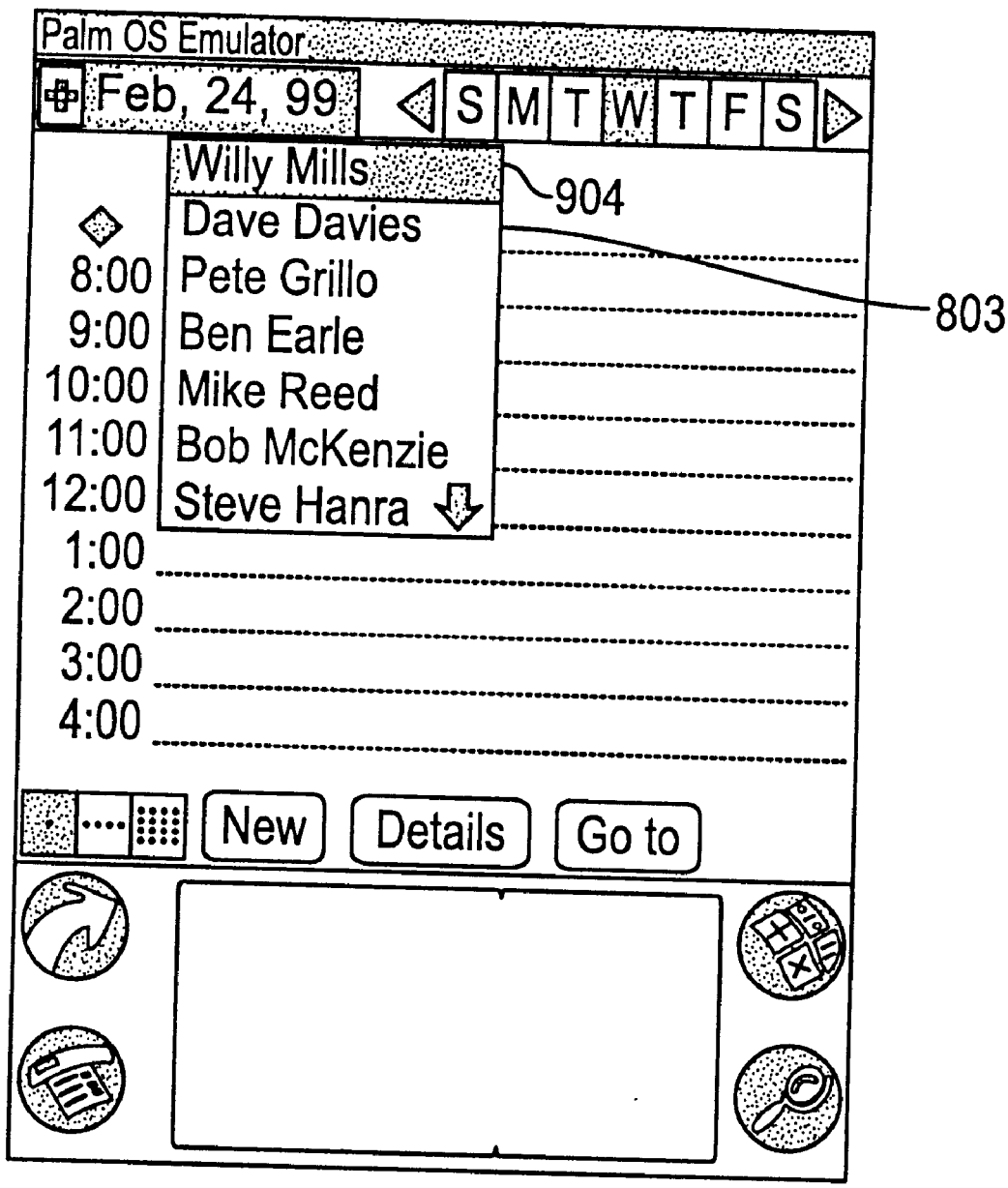
FIG. 9G is an illustration of a user interface display of the present invention showing a pull-down window for selecting one of the calendars to be displayed.

FIG. 9F shows a single calendar similar to that of 9A with the exception of an open appointment icon 902 that indicates that a specific time period is open. FIG. 9G is an illustration showing the pull-down window 803 which may be accessed by selecting the pull-down icon 134. In one embodiment, the pull-down window requires only a part of the display 110 of the PDA 100. As shown, a currently selected calendar is indicated by way of a highlight bar 904.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A portable data storage module for simultaneously depicting multiple calendars on a single display comprising:
 a portable, hand-held housing including a top face, a bottom face, and a side wall therebetween for defining an interior space;
 an input device situated on the top face of the housing and adapted for allowing input of data;
 a display situated on the top face of the housing and adapted for depicting data;

memory situated in the interior space of the housing for storing a plurality of calendars each including a plurality of scheduled matters; and a controller situated in the interior space of the housing and connected between the input device, the display, and the memory, the controller suitable for simultaneously depicting a plurality of the calendars on the display.

2. The portable data storage module as recited in claim 1, wherein the scheduled matters are depicted on the display with each calendar.

3. The portable data storage module as recited in claim 1, wherein the calendars are divided into increments of hours.

4. The portable data storage module as recited in claim 1, wherein the calendars are divided into increments of days.

5. The portable data storage module as recited in claim 1, wherein the calendars are divided into increments of weeks.

6. The portable data storage module as recited in claim 1, wherein the controller is suitable for manipulating the calendars.

7. A method for controlling the presentation of at least one calendar on a display of a portable data storage module comprising the operations of:

storing various calendars within a portable data storage module in separate databases, depicting at least one calendar on a display of a portable data storage module, the display situated on a top face of the portable data storage module;

depicting a plurality of icons each corresponding to increments of time selected from the group of increments of time including hours, days, and weeks;

allowing the selection of one of the icons; and dividing the at least one calendar into increments of time corresponding to one of the icons that is selected.

8. The method as recited in claim 7, and further comprising the operation of:

altering one of the icons upon a plurality of calendars being displayed simultaneously.

9. The method as recited in claim 8, wherein the selected icon is altered upon a plurality of the calendars being displayed simultaneously.

10. The method as recited in claim 9, wherein the selected icon is altered as a function of a number of the calendars being displayed simultaneously.

11. A method for controlling the presentation of a plurality of calendars on a display of a portable data storage module comprising the operations of:

storing various calendars within a portable data storage module in separate databases;

providing a window on a display of a portable data storage module which identifies each of the calendars, the display situated on a top face of the portable data storage module;

allowing the selection of the identified calendars displayed in the window; and simultaneously displaying all of the selected calendars.

12. The method as recited in claim 11, wherein upon a plurality of calendars being selected, each of the selected calendars are depicted simultaneously.

13. The method as recited in claim 12, wherein upon a plurality of calendars being selected, one of the selected calendars may be replaced with another calendar.

14. The method as recited in claim 11, wherein the selection of the calendars is executed using check boxes.

15. The method as recited in claim 11, wherein the window is enabled upon selecting an icon.

16. The method as recited in claim 11, wherein the window is a pull-down window.

17. The method as recited in claim 11, wherein each calendar that is selected is given a calendar heading.

18. A method for controlling the presentation of a plurality of calendars on a display of a portable data storage module comprising the operations of:

storing various calendars within a portable data storage module in separate databases;

depicting a plurality of calendars simultaneously on a display of a portable data storage module, the display situated on a top face of the portable data storage module, wherein each calendar is divided into sections corresponding to increments of time and scheduled matters are depicted in the sections; and altering a size of the sections as a function of a number of the calendars simultaneously depicted.

19. The method as recited in claim 18, wherein the size of the sections is inversely proportional to the number of calendars simultaneously depicted.

20. A method for controlling the presentation of a plurality of calendars on a display of a portable data storage module comprising the operations of:

storing various calendars within a portable data storage module in separate databases;

depicting a plurality of calendars with scheduled matters on a display of a portable data storage module, the display situated on a top face of the portable data storage module; and allowing movement of the scheduled matter of one of the calendars to another one of the calendars.

21. The method as recited in claim 20, wherein scheduled matter is moved by dragging the scheduled matter on the display between the calendars.

22. A method for simultaneously depicting multiple calendars on a display of a portable data storage module comprising the operations of:

providing a plurality of calendar databases each including a calendar having a plurality of scheduled matters;

providing a common database including a plurality of identification data sets each corresponding to the calendar of one of the calendar databases, the identification data sets each including attributes corresponding to the calendar database; and displaying the calendars of the calendar databases on a top face of the portable data storage module in accordance with the attributes.

23. The method as recited in claim 22, wherein one of the attributes indicates that one of the calendars is selected.

24. The method as recited in claim 22, wherein one of the attributes indicates that one of the calendars is a primary calendar.

25. The method as recited in claim 22, wherein one of the attributes indicates that one of the calendars is read only.

26. The method as recited in claim 22, wherein one of the attributes indicates that one of the calendars is a foreign calendar.

27. The method as recited in claim 22, and further comprising the operation of:

manipulating the calendars of the calendar databases.

* * * * *

(12) EX PARTE REEXAMINATION CERTIFICATE (10204th)
United States Patent
Pivowar et al.

(10) Number: US 6,466,236 C1
(45) Certificate Issued: Jun. 26, 2014

(54) SYSTEM AND METHOD FOR DISPLAYING AND MANIPULATING MULTIPLE CALENDARS ON A PERSONAL DIGITAL ASSISTANT

(75) Inventors: Alvin Pivowar, Portland, OR (US); Steve Hanrahan, Portland, OR (US); Pete Grillo, Portland, OR (US)

(73) Assignee: Access Co., Ltd., Saragaku-cho, Chiyoda-ku, Tokyo (JP)

Reexamination Request:
No. 90/012,515, Sep. 12, 2012

Reexamination Certificate for:
Patent No.: 6,466,236
Issued: Oct. 15, 2002
Appl. No.: 09/288,774
Filed: Apr. 8, 1999

(51) Int. Cl.
*G06F 3/048* (2013.01)
*G06Q 10/10* (2012.01)

(52) U.S. Cl.
CPC ........... *G06Q 10/109* (2013.01); *Y10S 715/963* (2013.01)
USPC ............................ 715/835; 715/963; 715/864

(58) Field of Classification Search
None
See application file for complete search history.

(56) References Cited

To view the complete listing of prior art documents cited during the proceeding for Reexamination Control Number 90/012,515, please refer to the USPTO's public Patent Application Information Retrieval (PAIR) system under the Display References tab.

*Primary Examiner* — Dennis Bonshock

(57) ABSTRACT

A portable, hand-held personal digital assistant is provided for simultaneously depicting multiple calendars on a single display. The personal digital assistant includes a portable, hand-held housing including a top face, a bottom face, and a side wall therebetween for cleaning an interior space. An input device is situated on the top face of the housing for allowing input of data. Associated therewith is a display situated on the top face of the housing for depicting data. Situated in the interior space of the housing is memory for storing a plurality of calendars each including a plurality of scheduled matters. Finally, controller is situated in the interior space of the housing and connected between the input device, the display, and the memory. The controller serves for simultaneously depicting a plurality of the calendars on the display. By conveniently displaying the multiple calendars, the present invention allows a user to more effectively manipulate the same.

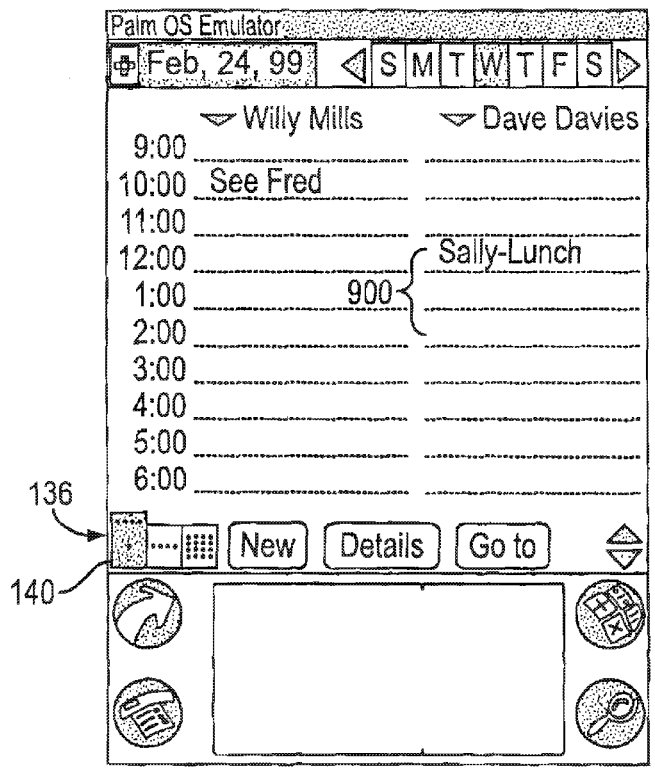

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-6 are cancelled.

Claims 7-27 were not reexamined.

\* \* \* \* \*